(12) United States Patent
Della Rocca et al.

(10) Patent No.: US 10,371,376 B2
(45) Date of Patent: Aug. 6, 2019

(54) INDUSTRIAL FURNACE AND PROCESS FOR CONTROLLING THE COMBUSTION INSIDE

(71) Applicant: TENOVA S.p.A., Milan (IT)

(72) Inventors: Alessandro Della Rocca, Vasto (IT); Massimiliano Fantuzzi, Genoa (IT)

(73) Assignee: TENOVA S.p.A., Milan (IT)

( * ) Notice: Subject to any disclaimer, the term of this patent is extended or adjusted under 35 U.S.C. 154(b) by 262 days.

(21) Appl. No.: 14/898,899

(22) PCT Filed: Jun. 27, 2014

(86) PCT No.: PCT/IB2014/062654
§ 371 (c)(1),
(2) Date: Dec. 16, 2015

(87) PCT Pub. No.: WO2014/207711
PCT Pub. Date: Dec. 31, 2014

(65) Prior Publication Data
US 2016/0138806 A1    May 19, 2016

(30) Foreign Application Priority Data

Jun. 28, 2013 (IT) .............................. MI2013A1093

(51) Int. Cl.
*F23L 7/00* (2006.01)
*F27D 99/00* (2010.01)
(Continued)

(52) U.S. Cl.
CPC ............... *F23L 7/002* (2013.01); *F23C 9/08* (2013.01); *F23L 7/005* (2013.01); *F23N 5/08* (2013.01);
(Continued)

(58) Field of Classification Search
CPC .... F23C 9/08; F23L 7/005; F23N 5/08; F23N 5/082; F23N 5/16; F27B 9/20; F27B 9/2407; F27B 9/40; F27D 99/0033
(Continued)

(56) References Cited

U.S. PATENT DOCUMENTS 3,233,650 A * 2/1966 Cleall ....................... F23D 5/16
431/1
3,307,608 A * 3/1967 Cowan ..................... F23N 5/08
340/548
(Continued)

FOREIGN PATENT DOCUMENTS

| EP | 2 527 734 A1 | 11/2012 |
|---|---|---|
| RU | 2 091 669 C1 | 9/1997 |
| RU | 2 124 675 C1 | 1/1999 |

OTHER PUBLICATIONS

International Search Report and Written Opinion dated Oct. 15, 2015 in PCT/IB2014/062654 filed Jun. 27, 2014.
(Continued)

*Primary Examiner* — Scott R Kastler
*Assistant Examiner* — Michael Aboagye
(74) *Attorney, Agent, or Firm* — Oblon, McClelland, Maier & Neustadt, L.L.P.

(57) ABSTRACT

Industrial furnace (1) which can be used for example for treating semi-finished and siderurgical products, metal and inorganic materials, comprising a) a hot chamber (3) in which a combustion takes place and the hot gases generated by the combustion come in direct contact with the materials to be treated (p) in the furnace itself; B) a combustion stabilizing system in turn comprising b1) an injection system in turn comprising at least a mixer (11) arranged to mix a fuel and a diluent before injecting them into the hot chamber (3). The diluent has the effect of reducing the amount of
(Continued)

nitrogen oxides in the combustion products. It considerably reduces the consumption of required diluent and the Nox emissions in the fumes.

7 Claims, 3 Drawing Sheets

(51) Int. Cl.
    *F23N 5/08*     (2006.01)
    *F23C 9/08*     (2006.01)
    *F23N 5/16*     (2006.01)
    *F27B 9/20*     (2006.01)
    *F27B 9/24*     (2006.01)
    *F27B 9/40*     (2006.01)

(52) U.S. Cl.
    CPC ............... *F23N 5/082* (2013.01); *F23N 5/16* (2013.01); *F27B 9/20* (2013.01); *F27B 9/2407* (2013.01); *F27B 9/40* (2013.01); *F27D 99/0033* (2013.01); *F23C 2900/99001* (2013.01); *F23L 2900/07002* (2013.01); *F23L 2900/07003* (2013.01); *Y02E 20/342* (2013.01)

(58) Field of Classification Search
    USPC ............................... 266/78; 431/89, 173, 174
    See application file for complete search history.

(56) References Cited

U.S. PATENT DOCUMENTS

| | | | |
|---|---|---|---|
| 5,120,214 A * | 6/1992 | West | F23N 5/16 431/12 |
| 6,461,145 B1 | 10/2002 | Giraud et al. | |
| 7,162,864 B1 * | 1/2007 | Schefer | F23C 9/00 123/1 A |
| 2002/0055078 A1 | 5/2002 | Giraud et al. | |
| 2004/0033460 A1 | 2/2004 | Lanary et al. | |
| 2008/0261162 A1 | 10/2008 | Lanary et al. | |
| 2010/0151397 A1 | 6/2010 | Farrell et al. | |

OTHER PUBLICATIONS

Combined Office Action and Search Report dated Feb. 8. 2018 in Russian Patent Application No. 2015154449 (with English language translation), 15 pages.

Brown. K. "Furnaces of Iron and Steel Metallurgy Plants", State Scientific and Technical Publishing House of Literature on Ferrous and Non-Ferrous Metallurgy, vol. 1, 1961, pp. 28-29 (with cover page and partial English language translation).

Artobolevskiy, I.I. "Polytechnic Dictionary", Soviet Encyclopedia, 1977, pp. 76 (with cover page and partial English language translation).

* cited by examiner

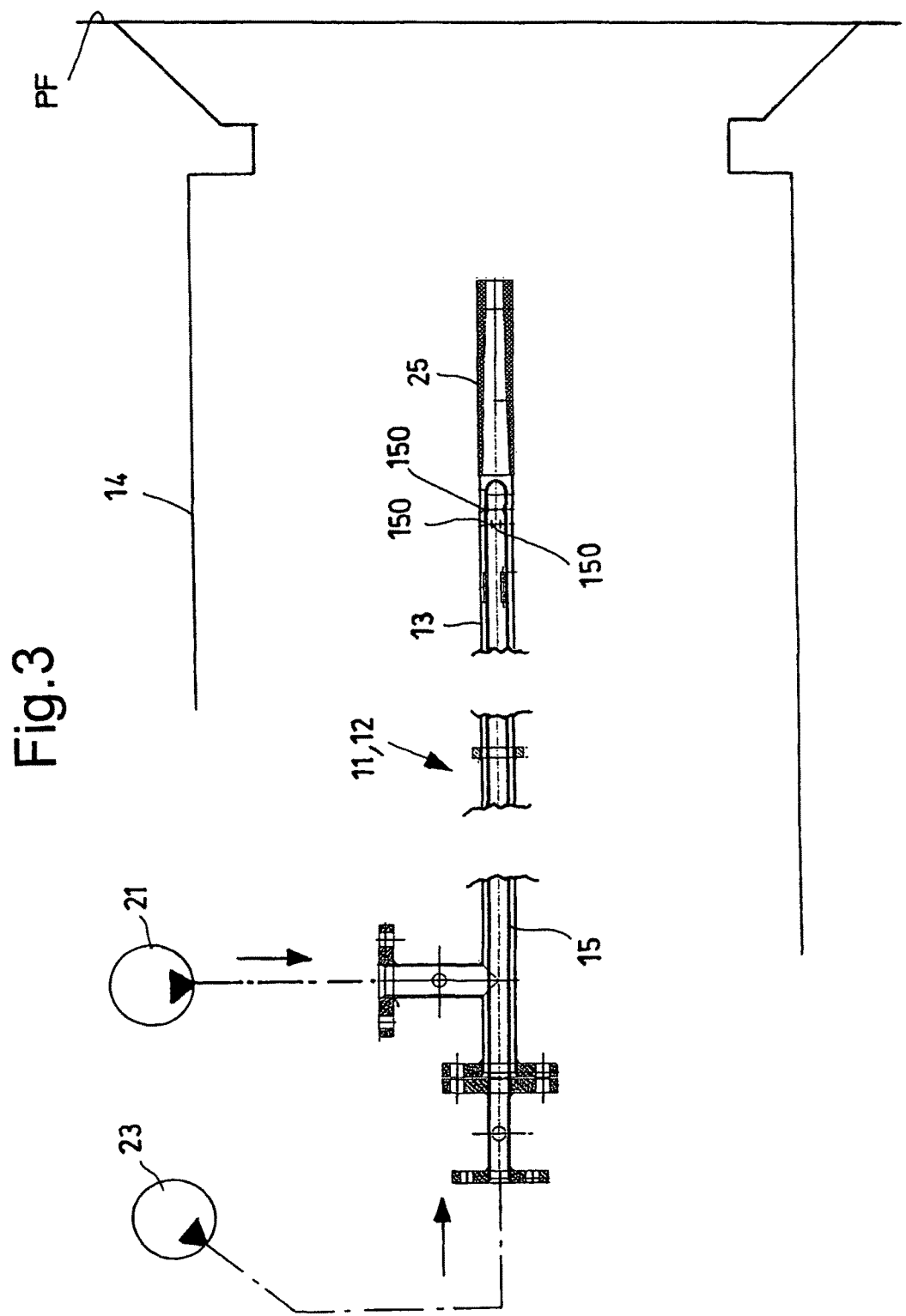

INDUSTRIAL FURNACE AND PROCESS FOR CONTROLLING THE COMBUSTION INSIDE

FIELD OF THE INVENTION

The present International patent application claims the priority of Italian application no MI2013A001093, and encloses the content through reference.

The present invention concerns a system and a process for eliminating, or at least reducing, the emissions of nitrogen oxides generated by industrial furnaces and in general in industrial combustion processes.

STATE OF THE ART

The flameless combustion could be a valid method for reducing the emissions of nitrogen oxides (NOx) in industrial combustions, in particular in furnaces of the so-called free combustion type, i.e. in which the combustion heating the furnace occurs in the same chamber—currently called hot chamber—in which there are the materials or the objects to be heated. However, the numerous physical parameters that affect a flameless combustion, the poor intrinsic monitorability in an "invisible" phenomenon, the interaction between the various burners that are possibly present, the geometrical characteristics of the hot chamber that affect the fluid dynamics in the hot chamber and the relative interactions with the combustion kinetics and the fact that materials or products to be heated having variable shapes and heat characteristics transit inside the chamber, are all factors that can generate local instability in the combustion process, such an instability being associated with hot spots, i.e. local thermal spikes that in turn increase the production of total NOx and therefore frustrate the effort of reducing such harmful emissions.

It is currently known to limit the formation of these thermal spikes by injecting a suitable diluent agent; more in particular it is known to inject water vapour in boilers for generating electric energy with the purpose of reducing the emissions of NOx. Such a massive and indiscriminate injection, however, involves the entire volume of the combustion chamber without considering local phenomena.

Moreover, the injection of a diluent fluid in a combustor causes an increase in the specific consumptions due to the greater volume of fumes that transport a significant amount of energy, which constitutes the greatest thermal loss of the system, towards the environment outside. For such a reason the indiscriminate injection of great amounts of diluent fluid inside a thermal process is generally discouraged due to the increase in the consumption and of the consequent increase in the emissions of carbon dioxide, due to the greater amounts of fuel burnt for the same useful effect on the thermal process.

One purpose of the present invention is to avoid the drawbacks and the limitations mentioned above in the state of the art and, in particular, to provide a system and a process for reducing the emissions of nitrogen oxides in industrial combustions that require less significant diluents supply in the combustion.

SUMMARY OF THE INVENTION

Such a purpose is achieved with an industrial furnace having features in accordance with the sent application.

Such a purpose is also achieved with a process for controlling the combustion in the aforementioned furnace having features in accordance with the present application.

The advantages that can be achieved with the present invention shall become clearer, to the person skilled in the art, from the following detailed description of a particular embodiment given as an example and not for limiting purposes, illustrated with reference to the following schematic figures.

LIST OF FIGURES

FIG. 3 shows the side view, partially in section, of an injector of the furnace of FIG. 1.

DETAILED DESCRIPTION

Figure 1:
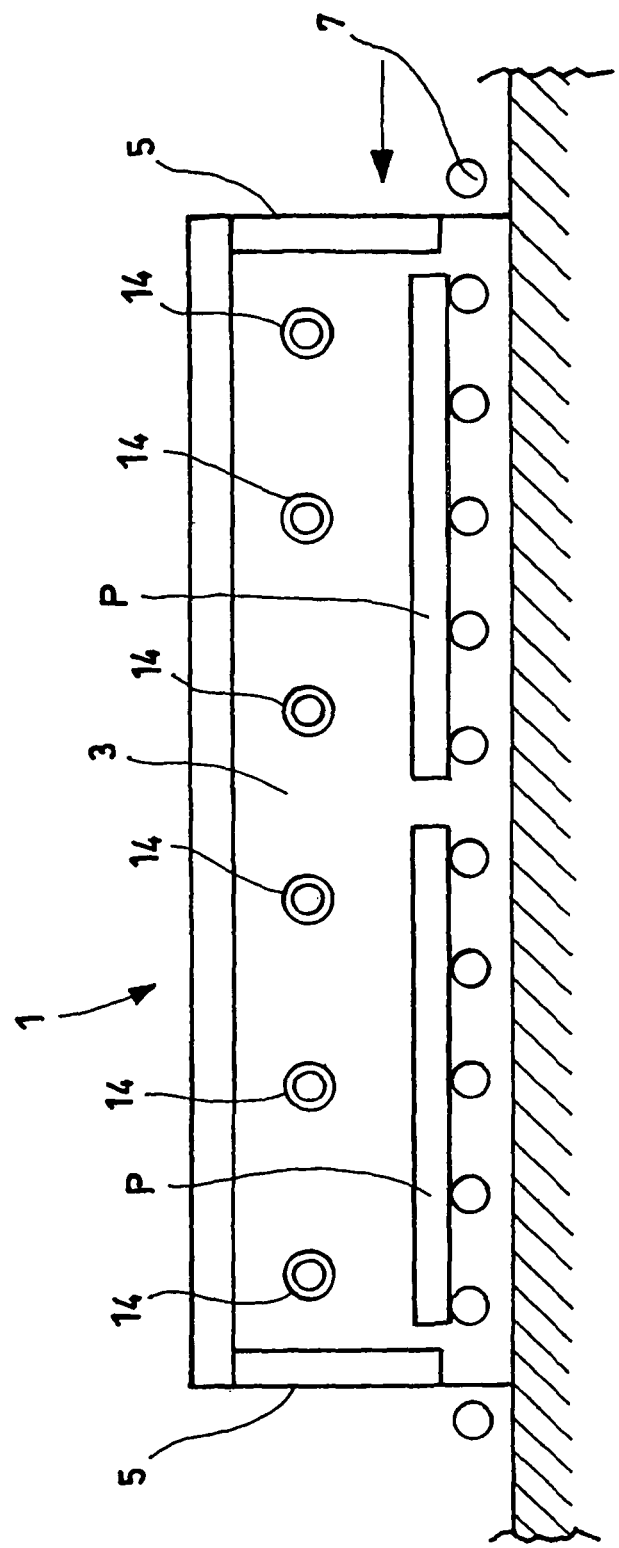
FIG. 1 shows the longitudinal view, partially in section, of an industrial furnace according to one particular embodiment of the invention.
Figure 2:
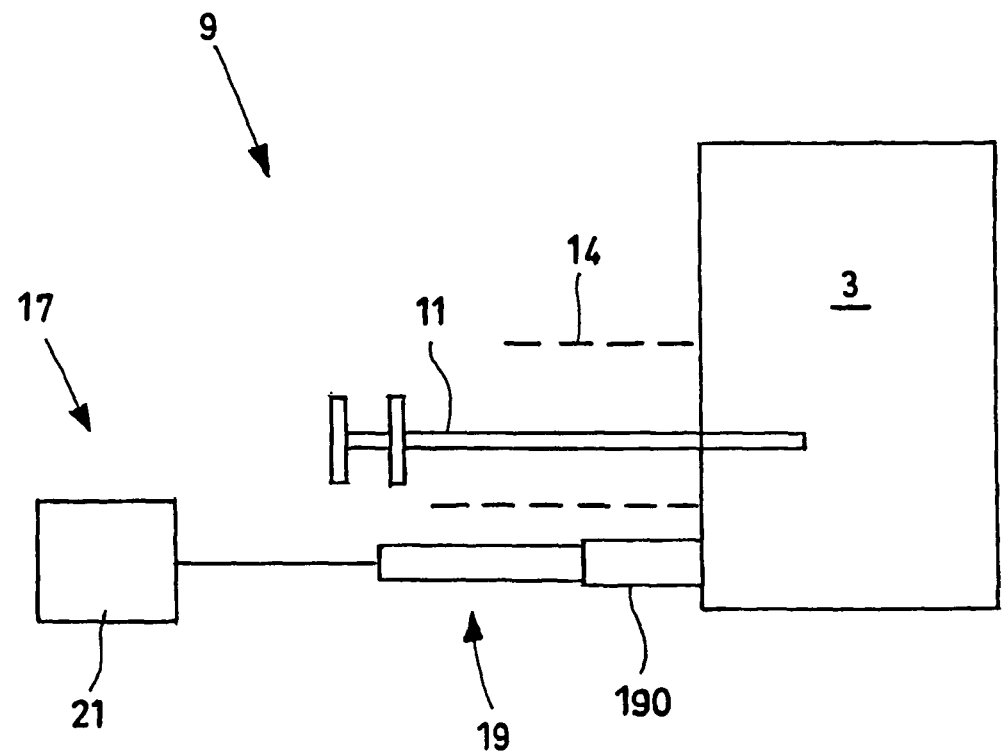
FIG. 2 shows a functional diagram of the combustion stabilising system of the furnace of FIG. 1.

FIGS. 1-3 relate to an industrial furnace according to one particular embodiment of the invention, wholly indicated with reference numeral 1. The furnace 1 can be of the type for example used for heating slabs, blooms, wire rods, billets, sheets and other semi-finished siderurgical products before undergoing further hot working operations, or a furnace for heating inorganic non-metal materials like for example ceramic materials, or again sintering or melting materials in general. The furnace 1 is provided with a hot chamber 3 in which a combustion takes place and the hot gases generated by such a combustion come in direct contact with the materials to be treated in the furnace itself licking them directly.

The hot chamber 3 can be for example a rectilinear tunnel with an overall parallelepiped shape, that is closed at the ends by mobile dividing walls 5 that are capable of opening up so as to allow the materials or products to be processed P to enter, for example conveyed on a roller plane or other suitable movement system 7, for example a suitable continuous roller conveyor.

The furnace 1 is moreover provided with a combustion stabilising system 9 in turn comprising:

an injection system in turn comprising at least a mixer 11 arranged to mix a fuel and a diluent before injecting them into the hot chamber 3, where the diluent has the effect of reducing the amount of nitrogen oxides (NOx) in the products resulting from the combustion between the fuel and a suitable comburent, like for example oxygen from the atmosphere.

The injection system can moreover comprise, for example, suitable pumps 21, 23 which supply the mixer 11 with the fuel and the diluent.

The mixer 11 can comprise a jet pipe or injector 12 in turn comprising an external tubular rod or another outer duct 13 containing inside it a tubular rod or another inner duct 15 (FIG. 3). One from the outer duct 13 and inner duct 15 is supplied with the comburent, for example a mixture of gaseous or liquid hydrocarbons, whereas the other one from the inner duct 15 or outer duct 13 is supplied with a diluent. The diluent can advantageously be water vapour which, differently from others and in addition to having a low cost, offers the advantage of not adding nitrogen compounds to the combustion.

Preferably the tubular rod or the inner duct 15 is provided, near to or at its tip, with one or more injection holes 150 through which the fuel or the diluent is injected in the flow respectively of diluent or of fuel that flows in the outer duct 13. Once they have been mixed in the outer duct 13, the fuel and diluent are ejected outside—for example introduced in the combustion chamber 3—through for example a last tract of convergent duct 25.

One or more injectors 12 are preferably inserted in a relative burner 14, which ignites the mixture of fuel and of diluent possibly after having mixed them with a comburent—like for example oxygen—in addition to oxygen from the atmosphere.

The reference PF in FIG. 3 indicates the inner wall of the furnace through which the burner or the burners 14 lead to and face the hot chamber 3.

The furnace 1 can advantageously be provided with several mixers 11 or injectors 12, so as to further improve the distribution of fuel and diluent in the chamber 3.

The furnace 1 is moreover provided with a control system 17 that is arranged to act on the injection system so as to eliminate or, in any case, reduce the formation of flames and other hot spots during the combustion in the hot chamber. By "hot spots", in the present description, we mean relatively small areas with respect to the overall volume of the hot chamber, corresponding to a concentration of temperature, and they can often manifest as a globular flame, with a diameter of around a few centimeters and that are visible with the naked eye.

Advantageously, the control system 17 comprises at least a vibration detector 19 that is arranged to detect optical, electromagnetical, mechanical vibrations—like for example an acoustic microphone or an accelerometer—in the hot chamber 3 and it is arranged to control the injection system according to the detections of the vibration detector so as to eliminate or, in any case, reduce the formation of flames and other hot spots during the combustion in the hot chamber, so as to keep a flameless combustion in the hot chamber 3 as much as possible.

Preferably, the at least one vibration detector 19 is arranged to detect vibrations at least in a frequency band that is substantially comprised between 10 hertz and 30 kilohertz, and more preferably, at least in a band comprised between 20 hertz and 20 kilohertz. It has indeed been found that these substantially acoustic frequency bands are particularly important in order to detect the possible presence of unstable hot spots, and their formation and disappearance.

Advantageously, the at least one vibration detector 19 comprises a photodetector, i.e. a sensor for electromagnetic radiation in the visible and/or infrared and/or ultraviolet spectrum. A photodetector offers the advantage of not being affected by the unavoidable mechanical vibrations and by the noises present in the furnace and in the factory in which it is located, providing significant indication substantially only on the hot spots and on whether the combustion occurs without or with a flame. The detection in the ultraviolet field was particularly efficient and significant, even if it is preferable to cover, in the detections, UV frequencies and IR frequencies as well as those in the visible spectrum: this makes it possible to detect the hot spots with greater precision and reliability, as well as the hot spots that cannot be detected in the sole visible spectrum, i.e. the hot spots that are not luminous and that are not associated with a flame.

The photodetector can comprise for example a sensor that is selected among the following group: a photoresistor, a photodiode, a phototransistor, a photocell, a photovoltaic cell. The photodetector directly faces onto the hot chamber 3. Preferably, the vibration detector 19 comprises also an optical collimator 190, in turn comprising for example one or more lenses, mirrors or other dioptres, that collimate the rays coming from the hot chamber on the photodetector.

The control system moreover comprises a logic unit 21 that is programmed or in any case is arranged for acquiring the detections of the vibration detector 19, processing and generating, based upon these, suitable driving signals that act on the injection system and, in particular, on the mixer or on the mixers 11. The logic unit 21 can comprise for example one or more programmable microprocessors.

The logic unit 21 is preferably programmed or arranged so as to act on the injection system by comparing the frequency spectrum of the output signal of the detector—or of the detectors—of vibrations with an "ideal" frequency spectrum or with a reference, the latter corresponding to an optimal functioning of the furnace 1 with a flameless combustion. For such a purpose, the logic unit 21 can evaluate the differences point-by-point between the two spectrums, or the average differences in frequency bands that are sufficiently small and possibly weighted with suitable coefficients. Preferably the spectrums are also compared in a frequency band that is substantially comprised between 10 hertz and 30 kilohertz, and more preferably comprised between 20 hertz and 20 kilohertz.

In order to control the injection system, the logic unit can be programmed or in any case arranged so as to actuate several alternatives of algorithms, for example optimal control algorithms, PID controllers—Proportional/Integral/Derivative—, self-learning algorithms.

The furnace 1 can be provided with many mixers 11 or injectors 12 that are controlled based upon the detections of a single vibration detector 19, or with a number N of injectors 12 or mixers 11 that are controlled based upon the detections of M vibration detectors 19, where M and N are both greater than 1 and M and N can be the same as or different from one another.

In one embodiment, each mixer 11 is controlled based upon the detections by a single vibration detector 19 that is associated with such a mixer and is positioned near to the mixer 11 in question, i.e. M=N, so that, for example, each pair of mixer 11/detector 19 monitors and controls a portion of hot chamber nearest to them. In another embodiment, a number N of injectors 12 or mixers 11 that are controlled based upon the detections of M vibration detectors 19, where M and N are both greater than 1, M<N and each mixer 11 is driven based upon the detections of several vibration detectors 19.

The adjustment of each mixer 11 or injector 12 can be ON/OFF, i.e. simply consisting of activating or deactivating the mixer or the mixers 11, or a continuous variation—or in any case with several levels—of the overall flow rate of mixture fuel+diluent dispensed by each mixer 11. The ratio between the flow rate of fuel and that of the diluent dispensed by each mixer 11 can be constant or variable over time, even if the control with constant ratio between the flow rates of fuel and of diluent is capable of providing very satisfactory performances.

The control system can be of the feed-forward or feedback type. In the feed-forward version the logic unit 21 can drive the one or more injectors 12 or mixers 11 so as to simply reduce and possibly nullify the differences between the frequency spectrum of the furnace detected by the one or more vibration detectors 19 and the spectrum of the furnace operating in ideal flameless conditions. In the feed-forward control in other words the control system verifies the divergence of the current state of the system away from the reference state (monitoring) having the optimal emission levels, said reference state being obtained, for example, through an experimental characterisation of the burner carried out in the laboratory in conditions in which the process can be perfectly controlled. Consequently, it evaluates the degree of divergence with respect to the reference level and activates, deactivates or modifies the amount of fluid flow rate and the localization of the injection thereof acting on the corresponding control device of the injection system. In the feed-back adjustment, on the other hand, it is possible for example to continuously verify, through the aforementioned monitoring system, the variation of the signal consequent to the variation of the amount of fluid injected and modify it as a function of the reduction of emissions estimated based on the signal.

We shall now describe one example of the operation of the furnace 1, used for example to heat semi-finished metallurgical products such as, for example, blooms, bars or steel wire rods.

In the following operation example, the furnace 3 is provided with a single mixer 11 or injector 12 and with a single optical vibration detector 19.

The semi-finished products P enter the furnace 1 moved by the continuous conveyor 7. When a suitable number of semi-finished products P has entered the hot chamber 3 of the furnace, the mobile dividing walls 5 close.

According to the temperature in the hot chamber and to the optical signals detected by the detector 19, the control system, at predetermined time intervals—for example with a constant duration—modifies the flow rate of fuel Qc and of diluent Qd that the injector 12 or mixer 11 must gradually inject so as to bring the frequency spectrum of the signal emitted by the detector 19, as close as possible to the frequency spectrum of the furnace 3 in ideal flameless combustion conditions, or of flame combustion, if desired, for example in particular transients. If at a certain instant the detector 19 detects a spectrum indicating an undesired combustion with a flame, the control system can block the injection of fuel and also of the diluent into the hot chamber, or inhibit only the injection of fuel and continue, possibly in an increased amount, to inject the diluent until the flameless conditions have been re-established.

It has experimentally been found that the previous teachings make it possible to drastically reduce the feeds of diluent, in particular of water vapour, which are necessary for reducing the emissions of NOx in a process of flameless combustion. A first factor that contributes towards such a considerable reduction is mixing fuel and diluent before the injecting them in the hot chamber and, in particular, inside the injection jet pipe 12: indeed, in such conditions the mixing occurs more intimately and efficiently, protected from the turbulent environment of the hot chamber, which is a lot more disturbed and variable. Since it is dispensed already mixed with the comburent, the diluent is introduced right at the area of the hot chamber in which the combustion occurs, or in any case vary near to them, thus being much more effective also in much smaller amounts. Another factor that contributes towards such a considerable reduction is the controlled dispensing based upon the conditions of the combustion detected in the chamber: the diluent is, that is dispensed only where and when necessary, in the amount that is strictly necessary. Moreover, the previous provisions allowed to bring real combustions closer to the ideal flameless conditions, to the point of lowering the emissions of nitrogen oxides to 1 ppm, with 3% of $O_2$ in the dry fumes; contrarily, the emissions of NOx in flameless processes according to the state of the art had never been able to be below 50-70 ppm, always with 3% of $O_2$ in dry fumes. The control system of the combustion previously described moreover, makes it possible to optimise the conditions of flameless combustion very well also during perturbing and transient phenomena such as, for example, the passage in the furnace 3 of pieces to be treated with dimensions and shapes that are considerably different—it is sufficient to consider the large variety of siderurgical semi-finished products that a single furnace must heat—or the repeated opening and closing of the dividing walls 3.

The embodiments previously described can undergo several modifications and variants without departing from the scope of protection of the present invention.

Moreover, all the details can be replaced by technically equivalent elements. For example, the materials used, as well as the dimensions, can be any according to the technical requirements. It should be understood that the expression of the type "A comprises B, C, D" or "A is formed by B, C, D" comprises and describes also the particular case in which "A consists of B, C, D". The examples and lists of possible variants of the present application should be considered as non-exhaustive lists.

The invention claimed is:

1. A process for controlling combustion in an industrial furnace including a hot chamber and a combustion stabilising system, the process comprising:
   detecting, by a vibration detector included in a control system of the combustion stabilising system, any of optical, electromagnetical, acoustic or mechanical vibrations in the hot chamber;
   mixing, with a mixer of an injection system of the combustion stabilising system, a fuel and a diluent into the mixer;
   controlling, by a control system of the combustion stabilising system, an injection of the fuel mixed with the diluent in the hot chamber according to a signal output by the vibration detector to reduce an amount of nitrogen oxides present in combustion products and to eliminate or reduce a formation of flames or other hot spots during the combustion in the hot chamber, wherein
   the controlling includes:
      comparing a frequency spectrum of the signal output by the vibration detector with a target frequency spectrum of target combustion conditions of the hot chamber; and
      adjusting a flow rate of the fuel or the diluent fed into the hot chamber so that the frequency spectrum becomes the target frequency spectrum.

2. An industrial furnace used for treating semi-finished and siderurgical products, metal and inorganic materials, the industrial furnace comprising:
   a hot chamber in which a combustion takes place and hot gases generated by the combustion come in direct contact with the materials to be treated (p) in the industrial furnace itself; and
   a combustion stabilising system comprising:
      an injection system comprising at least a mixer configured to mix a fuel and a diluent before injecting them into the hot chamber; wherein the diluent has an effect of reducing an amount of nitrogen oxides in combustion products; and
      a control system including a vibration detector configured to detect any of optical electromagnetical, acoustic and mechanical vibrations in the hot chamber, the control system being configured to control the injection system according to a signal output by vibration detector to eliminate or reduce a formation of flames or other hot spots during the combustion in the hot chamber, where the hot spots indicate that the combustion is taking place in presence of flame, wherein the control system controls the injection system according to detections of the vibration detector by:

comparing a frequency spectrum of the signal output by the vibration detector with a target frequency spectrum of target combustion conditions of the hot chamber; and adjusting a flow rate of the fuel or the diluent fed into the hot chamber so that the frequency spectrum becomes the target frequency spectrum.

3. The industrial furnace according to claim 2, wherein the vibration detector is configured to detect vibrations in a frequency band between 10 hertz and 30 kilohertz.

4. The industrial furnace according to claim 2, wherein the vibration detector comprises a sensor selected among the following group: a photodetector, a photoresistor, a photodiode, a phototransistor, a photocell, a photovoltaic cell, and a detector of electromagnetical radiations comprised in a frequency band selected from one or more of the following: visible spectrum frequencies, infrared frequencies, and ultraviolet frequencies.

5. The industrial furnace according to claim 2, wherein the injection system comprises an injector, the injector comprises an outer duct that extends into the hot chamber, and an inner duct located in the outer duct, one of the inner duct and the outer duct is connected to a fuel source, the other of the inner duct and the outer duct is connected to a diluent source, and the injection system is configured to mix the fuel and the diluent inside the outer duct into a fuel-diluent mix before ejecting the fuel-diluent mix from the outer duct.

6. The industrial furnace according to claim 5, wherein the inner duct extends to inside the outer duct.

7. The industrial furnace according to claim 2, wherein the control system is further configured to compare the target frequency spectrum with the frequency spectrum in a frequency band between 10 hertz and 30 kilohertz.

* * * * *